J. A. COLIN.
DAMPER CONTROLLING MECHANISM.
APPLICATION FILED MAR. 17, 1913.

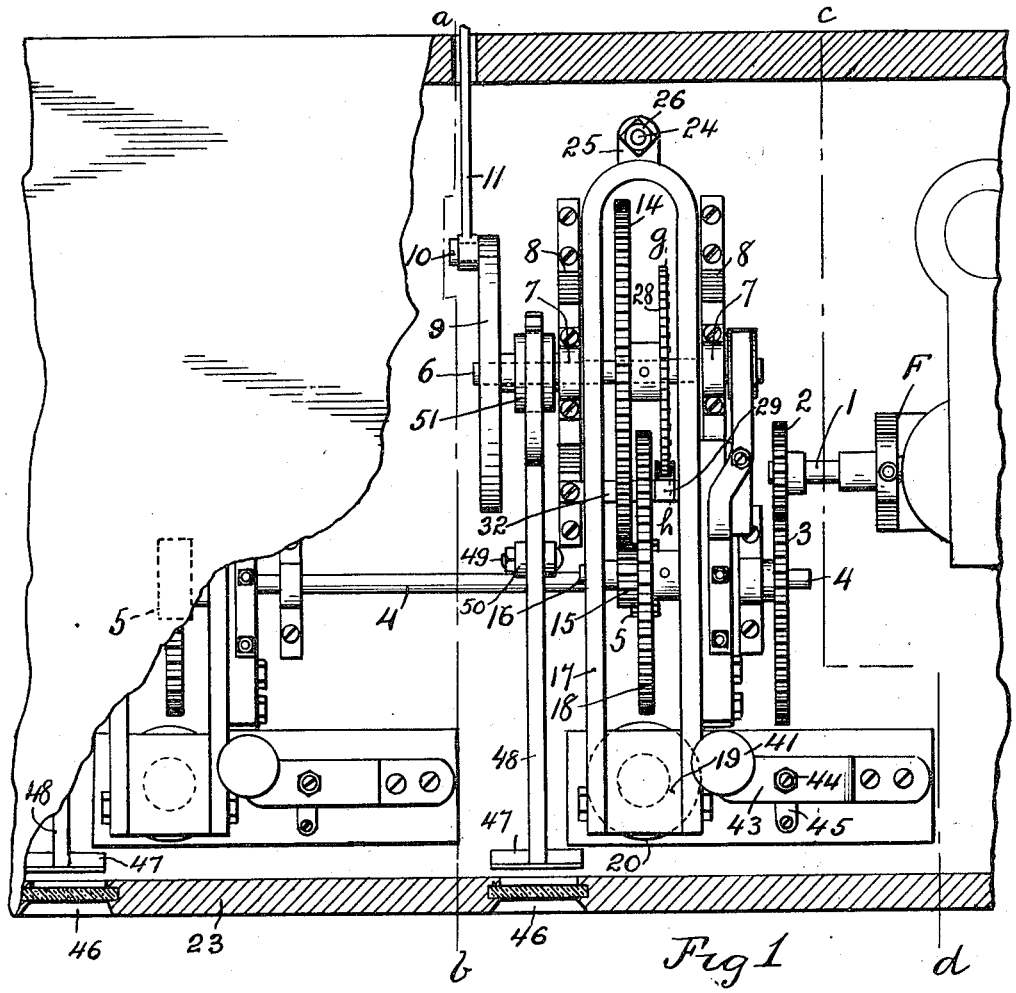
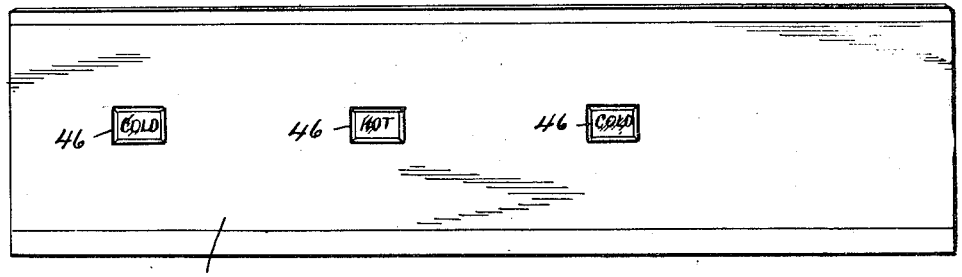

1,142,553.

Patented June 8, 1915.
4 SHEETS—SHEET 2.

WITNESSES:
R. E. Hamilton
E. B. House

INVENTOR.
Joseph A. Colin
BY Warren D. House
His ATTORNEY.

J. A. COLIN.
DAMPER CONTROLLING MECHANISM.
APPLICATION FILED MAR. 17, 1913.
1,142,553.
Patented June 8, 1915.
4 SHEETS—SHEET 3.
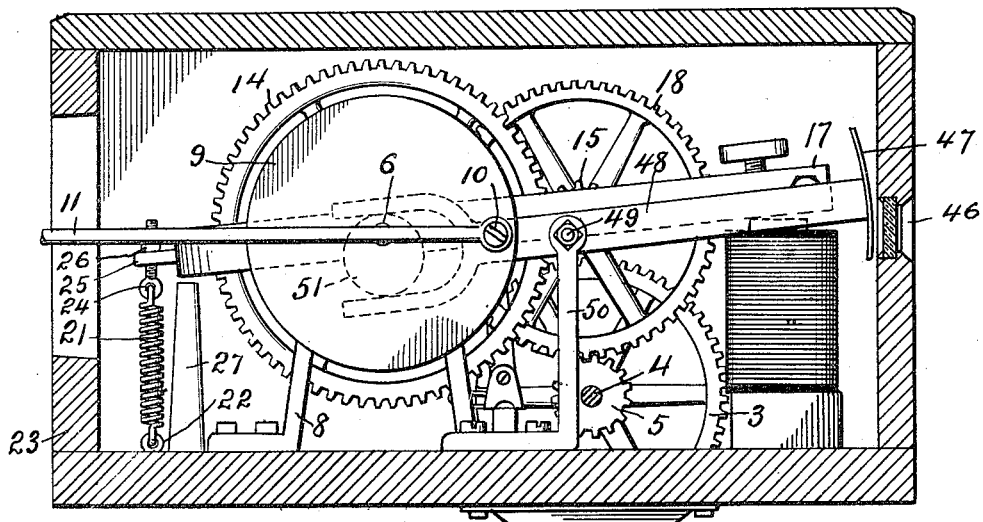
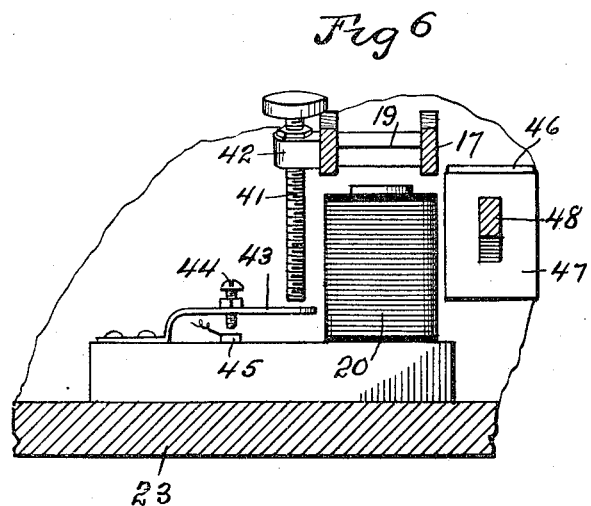
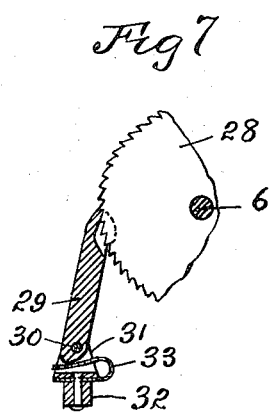
WITNESSES:
R. E. Hamilton
E. B. House
INVENTOR.
Joseph A. Colin
BY Warren D. House
His ATTORNEY.

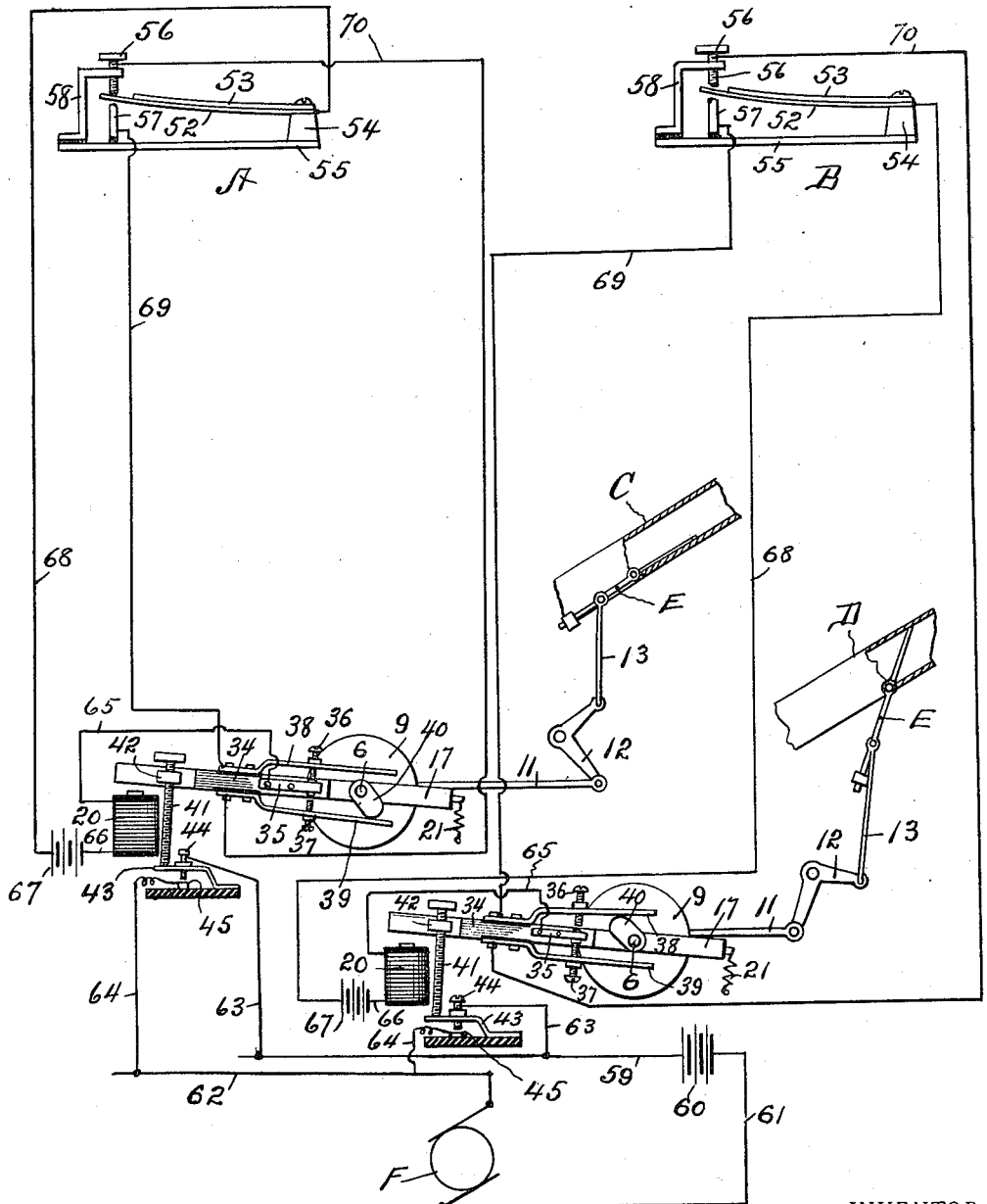

UNITED STATES PATENT OFFICE.

JOSEPH A. COLIN, OF MERRIAM, KANSAS.

DAMPER-CONTROLLING MECHANISM.

1,142,553.

Specification of Letters Patent.

Patented June 8, 1915.

Application filed March 17, 1913. Serial No. 754,841.

*To all whom it may concern:*

Be it known that I, JOSEPH A. COLIN, a citizen of the United States, residing at Merriam, in the county of Johnson and State of Kansas, have invented a certain new and useful Improvement in Damper-Controlling Mechanisms, of which the following is a specification.

My invention relates to improvements in damper controlling mechanisms.

My invention is particularly adapted for employment in connection with hot air furnaces but it may be employed with advantage for other uses where it may be desirable to automatically control the flow through one or more conduits in accordance with variations of temperature at one or more places.

One of the objects of my invention is to provide a simple, effective and durable mechanism by means of which a pre-determined even temperature may be retained in a room heated by hot air, steam, or hot water.

Other novel features of my invention are hereinafter fully described and claimed.

Figure 3:
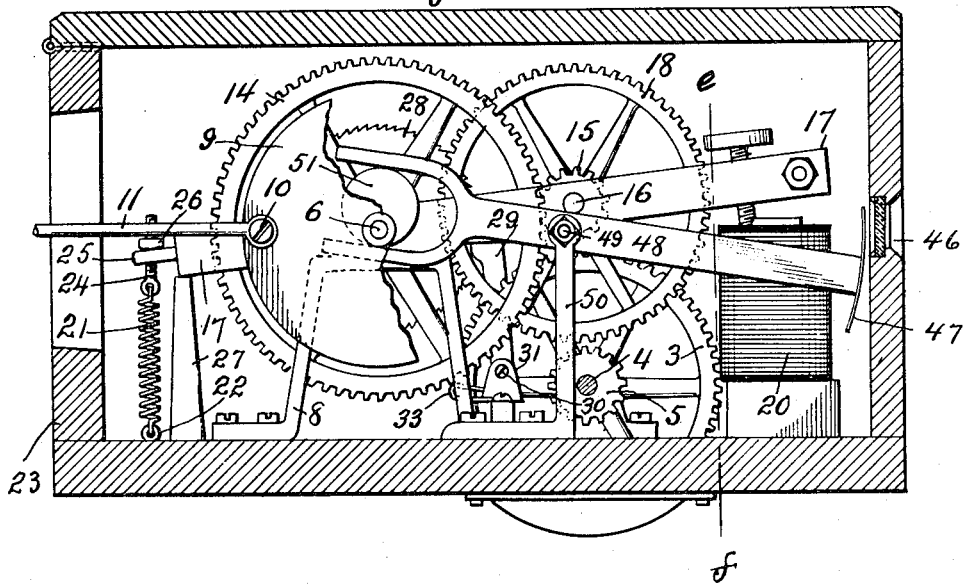
Figure 4:
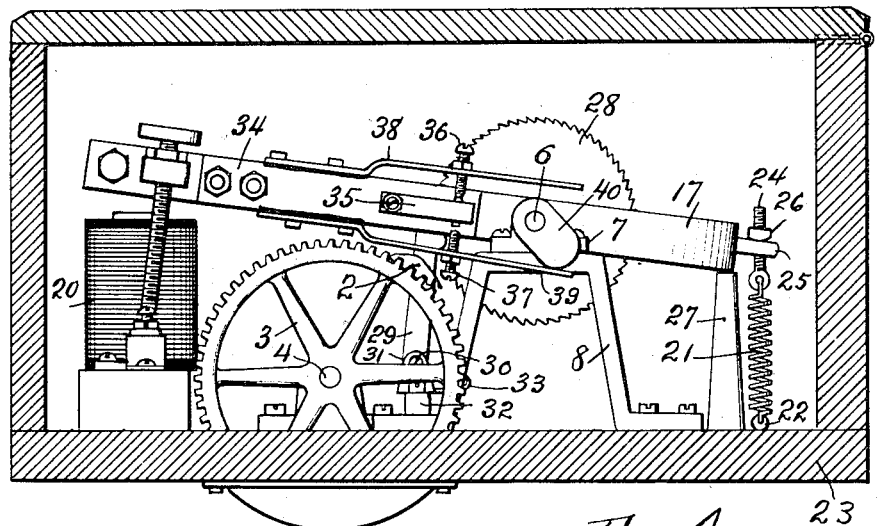

In the accompanying drawings, which illustrate my invention in its preferred form and as adapted to a hot air furnace mechanism—Figure 1 is a view partly broken away, partly in plan, and partly in horizontal section of a portion of the casing and some of the parts located therein. Fig. 2 is a front elevation, reduced, of the casing. Fig. 3 is a vertical section on the line *a—b* of Fig. 1. Fig. 4 is a vertical section, partly broken away, on the dotted line *c—d* of Fig. 1. Fig. 5 is a vertical section on the plane of the line *a—b* of Fig. 1. In this view the gearing is shown in the operative position for actuating the mechanism which operates the damper; while in Fig. 3 the parts are shown with the gearing in the inoperative position. Fig. 6 is a vertical sectional view on the line *e—f* of Fig. 3. Fig. 7 is a vertical section on the dotted line *g—h* of Fig. 1. Fig. 8 is a diagrammatic view of the electric circuits.

Similar characters of reference designate similar parts in the different views.

When the mechanism is to be applied to a hot air furnace system of a house, each room of the house has located in it, preferably, a thermostatic switch, two of which are shown in Fig. 8, said switches being designated generally by A and B respectively. Also in Fig. 8 are shown the two hot air pipes, C and D, which respectively lead to the rooms in which are located the thermostatic switch A and B.

E designates two swinging dampers, mounted respectively in the hot air pipes, C and D. Two mechanisms, respectively electrically connected with the thermostatic switches, A and B, are employed to swing the dampers E, to and from the closed position.

F designates an electric motor having an armature shaft 1, to which is secured, as is shown in Fig. 1, a pinion 2, which meshes with a spur gear wheel 3, secured to a driving shaft 4, which has mounted on it pinions 5, corresponding in number to the number of dampers which are employed.

In Fig. 1 portions of two independently operated damper mechanisms are shown. In this figure are shown also, in solid and dotted lines respectively, two driving pinions 5, for respectively operating the two independent damper operating mechanisms. As these damper operating mechanisms are constructed alike, a description of one will answer for the other.

Referring now, for convenience, to Figs. 1, 3 and 4, 6 designates a rotary member comprising a horizontal shaft, which is rotatively mounted in bearings 7, supported on two standards 8. Secured to the shaft 6 is a disk 9, having a crank pin 10, secured thereto, said crank pin being pivotally connected to one end of a connecting rod 11, the other end of which is connected to one arm of a bell crank lever 12, the other arm of which is pivotally connected to one end of a rod 13, the other end of which is pivotally connected to one of the dampers E, as shown in Fig. 8. Secured to the shaft 6 is a spur gear wheel 14, which meshes with a pinion 15, which is secured to a horizontal shaft 16, which is rotatively mounted in a pivoted device comprising a U-shaped bar 17, the arms of which are pivotally mounted on the shaft 6. Secured to the shaft 16 and rotatable therewith, is a spur gear wheel 18, which, when the bar 17 is swung to the position shown in Fig. 5, meshes with and is driven by the pinion 5, which is located on the shaft 4, directly below said gear 18. Secured to the forward end of the U-shaped bar 17, between the arms thereof, is an armature 19, shown in Figs. 1 and 6, which is located above and in the field of an electromagnet 20. When the electromagnet 20 is energized it will attract the armature 19, thereby swinging the bar 17 and with it the shaft 16 and gear 18, until the gear 18 meshes with the pinion 5, as shown in Fig. 5. For retracting the bar 17 to the position shown in Fig. 3, so as to disengage the gear wheel 18 from the pinion 5, I provide a vertical coil spring 21, having its lower end secured to an eye bolt 22, which is fastened in the bottom of a casing 23, which is employed to inclose a portion of the mechanism. The upper end of the spring 21 is secured to the lower end of a vertical screw 24, which extends through and is slidable in a rearwardly extending projection 25, at the rear end of the bar 17. On the bolt 24 is mounted a nut 26, which rests upon the projection 25. A post 27, mounted on the floor of the casing 23, may be employed to limit the swinging in one direction of the bar 17. To prevent retrograde rotation of the shaft 6, it may have secured to it a ratchet wheel 28, which is constantly engaged with a pawl 29, best shown in Fig. 7, which, at its lower end, is pivoted on a horizontal pin 30, mounted in a U-shaped plate 31, which is secured upon a plate 32. A U-shaped spring 33, is secured by one of its arms to the plate 32, and has its other arm bearing against the pawl 29, so as to hold the pawl in engagement with the ratchet wheel 28.

I will now describe the switch which is carried on the swinging bar 17;—referring particularly to Fig. 4. Secured to one arm of the bar 17 is a block 34, preferably of vulcanized fiber or some non-conducting material, and which has secured to it a contact plate 35, which is disposed between and is adapted to have alternately contact with it, two electrodes, 36 and 37, respectively secured to two spring metallic plates, 38 and 39, which in turn are secured respectively to the upper and lower sides of the block 34. The tension of the spring plates, 38 and 39, is such as will normally cause them to bring the contact members, 36 and 37, against the contact plate 35. For alternately breaking the circuit at the contact members 36 and 37, I provide a cam 40. For controlling the motor circuit, each bar 17 has mounted in it a vertically adjustable screw 41, which has screw threaded engagement with a lug 42, with which the bar 17, near its forward end, is provided. The lower end of the screw 41 is adapted to strike and press downwardly the free end of a spring plate 43, which carries a contact 44, which is adapted to strike but is normally separated from a contact 45. In order that the operator may know the positions of the dampers, the front side of the casing 23 is provided with a plurality of observation openings 46, which are located in front of a plurality of transverse plates 47, as is shown in Figs. 1, 3 and 5.

The plates 47 have each inscribed thereon the words "Hot" and "Cold." Each plate 47 is mounted on the forward end of a bar 48, which is pivotally mounted on a horizontal bolt 49 which is secured in the upper end of a standard 50, the lower end of which is supported upon the floor of the casing 23. The rear end of each bar 48 is bifurcated and has its arms embracing a disk 51, which is eccentrically mounted, as is best shown in Fig. 3, upon the shaft 6. When the shaft 6 is in the position shown in Fig. 3, the damper E controlled thereby will be in the open position, and the word "Cold" will appear at the observation opening, which is in front of the adjacent plate 47. When the damper E is in the closed position, as shown at the right in Fig. 8, the plate 47 will display the word "Hot" at the observation opening 46. For a description of the thermostatic switch, refer to Fig. 8. 52 and 53 designate two plates having different coefficients of expansion and being secured rigidly together, the lower plate being preferably a metal plate, such as German silver and the upper plate 53, being preferably hard rubber. The plates 52 and 53, are secured at one set of ends to a post 54, supported upon a base plate 55. The free end of the metallic plate 52 is located between two electrodes, 56 and 57, the latter electrode being mounted upon and insulated from the plate 55. The electrode 56 is preferably a screw, which is fitted in a screw threaded hole provided in a supporting bracket 58, which is mounted upon but insulated from the plate 55.

Now follows a description of the circuits shown in Fig. 8: A conductor 59 is connected to one pole of a battery 60, the other pole of which is connected by a conductor 61 to one brush of the motor F, the other brush of which is connected to a conductor 62. Conductors 63 respectively connect the contacts 44 to the conductor 59. Conductors 64 respectively connect the conductors 45 with the conductor 62. When either of the bars 17 is swung downwardly at its forward end it will, through the intermediacy of the screw 41, close the motor circuit through the adjacent contacts 44 and 45. Thus, if the bar 17, shown at the left in Fig. 8, is drawn downwardly through the energizing of the adjacent magnet 20, the screw 41 will force downwardly the adjacent plate 43 until the contacts 44 and 45 at the left are brought together. The current will then pass from the battery 60 through conductor 61, motor F, conductor 62, conductor 64, contacts 45 and 44, and conductors 63 and 59, back to battery 60. The motor F will thus be driven and will thereby cause rotation of the driving shaft 4, through the intermediacy of the gears 2 and 3. Both plates 35 are respectively connected by conductors 65 with one set of ends of the two magnet windings 20, the other set of ends of which are respectively connected by conductors 66, with one set of poles of batteries 67, the other set of poles of which are connected by conductors 68 with the thermostat plate 52. The contacts 57 are respectively connected by means of conductors 69 to the spring plates 38. The contacts 56 are respectively connected by conductors 70, with the plates 39.

I will now describe the operation of the mechanism, assuming the parts to be as shown in Fig. 8: Considering first the mechanism for operating the damper in the air pipe C, and which is controlled by the thermostatic switch A, it will be noted that the damper E is in the open position, thus permitting heated air to pass through the air pipe C, to the room in which is located the thermostatic switch A. As shown in Fig. 8, the thermostatic plate 52, is shown in contact with the screw 56, and the cam 40 is shown in the position in which the contact 37 will be separated from the contact plate 35. The left magnet 20 will thus be in an open circuit and no operation of the mechanism will be effected. Assuming now that the temperature in the room in which the thermostatic switch A is located rises to a point such that the thermostatic bar 53 will expand sufficiently to curve the plate 52 so that it will strike the contact 57, the circuit in which is located the left magnet 20 will become closed and the current will pass from the left battery 67, through conductor 66, magnet 20, conductor 65, contact 35, contact 36, spring plate 38, conductor 69, contact 57, plate 52, and conductor 68, back to left battery 67. The left magnet 20 will now be energized, thereby swinging downwardly the forward end of the adjacent bar 17, and through the intermediacy of the adjacent screw 41 and left contacts 44 and 45, closing the circuit in which motor F is located. The motor circuit being closed, the motor will start to run, and as the adjacent spur gear 18 has been swung by the bar 17 which supports it into engagement with the adjacent pinion 5, on the driving shaft 4, the rotation of the driving shaft will rotate the shaft 6 and disk 9 from the position shown at the left in Fig. 8, to the position of the mechanism at the right in Fig. 8. The parts controlling the damper E, in the air pipe C, will now be in the position represented by the parts which control the damper E in the air pipe D. The shaft 6 will be rotated from the position shown at the left in Fig. 8, to a position diametrically opposite or that shown at the right in Fig. 8. In this latter position the cam 40 will release the spring plate 39 so that the contact 37 will again contact with the plate 35, but the contact 36 will be separated from the plate 35, thereby breaking the circuit in which is located the magnet 20. The bar 17 will now be released and retracted to its normal position by the spring 21, thereby breaking the motor circuit at the contacts 44 and 45 and the motor will stop, until the temperature has cooled sufficiently to permit the thermostat plate 52, striking against the contact 56, at which time the parts will be as shown at the right, in Fig. 8, excepting the plate 52, which is shown disconnected from either of the contacts 56 or 57. When the plate 52 strikes the contact 56, and the damper operating parts are as shown at the right in Fig. 8, the magnet 20 will be energized, thereby swinging the bar 17 so as to close the motor circuit, whereupon the shaft 6 will be rotated one-half a revolution, thereby bringing the cam 40 back to the position shown at the left in Fig. 8. The circuit in which the magnet 20 is located will now be broken by the cam 40 striking the spring plate 39, whereupon the spring 21 will retract the bar 17 and all the parts will have reassumed their original positions, as represented at the left in Fig. 8.

I do not limit my invention to the structure shown and described, as various modifications, within the scope of the appended claims, may be made without departing from the spirit of my invention.

Having thus described my invention, what I claim and desire to secure by Letters Patent is:—

1. In a damper controlling mechanism, a damper, mechanism for operating said damper, a motor, driving means actuated by the motor, a thermostat, means controlled by said thermostat for operatively engaging the damper operating mechanism with and for disengaging it from said driving means, means for operating the motor, and means controlled by said thermostatically controlled means for controlling the motor operating means.

2. In a damper controlling mechanism, a damper, mechanism for operating the damper, an electric circuit including a motor, circuit controlling means, and a generator, driving means actuated by said motor, a thermostat, means controlled by the thermostat for operatively engaging the damper operating mechanism with and for disengaging it from said driving means, and means actuated by said thermostatically controlled means for operating said circuit controlling means.

3. In a damper controlling mechanism, a damper, mechanism for operating the damper, a motor, motor operating means, driving means actuated by the motor, electromagnetic mechanism including a thermostat for operatively engaging the damper operating mechanism with and for disengaging it from said driving means, and means controlled by said electromagnetic mechanism for controlling the motor operating means.

4. In a damper controlling mechanism, a damper, mechanism for operating the damper, an electric circuit including a motor, circuit controlling means and a generator, driving means actuated by said motor, electromagnetic mechanism, including a thermostat, for operatively engaging the damper operating mechanism with and for disengaging it from said driving means, and means controlled by said electromagnetic mechanism for operating said circuit controlling means.

5. In a damper controlling mechanism, a damper, mechanism for operating said damper, a motor, a driving shaft, means actuated by the motor for rotating the driving shaft, means for operating the motor, a thermostat, means controlled by the thermostat for bringing the driving shaft into and out of operative engagement with said damper operating mechanism, and means controlled by said thermostatically controlled means for controlling the motor operating means.

6. In a damper controlling mechanism a damper, a rotary member, means actuated by the rotary member for operating the damper, a movable device, a driving shaft, a motor, means for operating the motor, means for operating the driving shaft from the motor, means controlled by said movable device for controlling the motor operating means, driving mechanism arranged to connect and disconnect the rotary member with the driving shaft, the operation of said driving mechanism being controlled by said movable device, thermostatically controlled means for controlling the movement of said movable device, and means actuated by said rotary member for controlling the operation of said thermostatically controlled means.

7. In a damper controlling mechanism, a damper, two sets of mechanism arranged to be brought into and out of driving engagement with each other, means operated by one of said mechanisms for operating the damper, a motor for operating the other mechanism, circuit closing mechanism in circuit with the motor, means for bringing said two sets of mechanisms into driving engagement with each other and at the same time actuating said circuit closing mechanism to close the circuit, means for normally operating said bringing means to disengage said two sets of mechanisms and to open said circuit closing means, and thermostatically controlled means for operating said bringing means to engage said two sets of mechanisms and to close said circuit closing mechanism.

In testimony whereof I have signed my name to this specification in presence of two subscribing witnesses.

JOSEPH A. COLIN.

Witnesses:
WARREN D. HOUSE,
E. B. HOUSE.

Copies of this patent may be obtained for five cents each, by addressing the "Commissioner of Patents, Washington, D. C."